W. A. TURBAYNE.
DYNAMO ELECTRIC MACHINE.
APPLICATION FILED JAN. 25, 1917.

1,311,542.

Patented July 29, 1919.

WITNESS:
Edward F. Gumbert
Ralph Munden

INVENTOR.
William A. Turbayne.
BY
Raymond H. Van Vleck
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,311,542.   Specification of Letters Patent.   Patented July 29, 1919.

Application filed January 25, 1917.   Serial No. 144,463.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

The present invention relates to dynamo electric machines.

One of the objects of the present invention is to provide an improved field structure for a dynamo-electric machine which will insure "picking up" of said dynamo-electric machine when operated as a generator.

A further object of the invention is to provide the field structure of the dynamo-electric machine with a permanent magnet whereby to provide the initial excitation for said machine when it is being started as a generator and whereby flux from said permanent magnet will be prevented from being short circuited through the iron of the field structure.

Other objects will be apparent as the description proceeds.

Referring to the drawings.

Figures 1, 2:
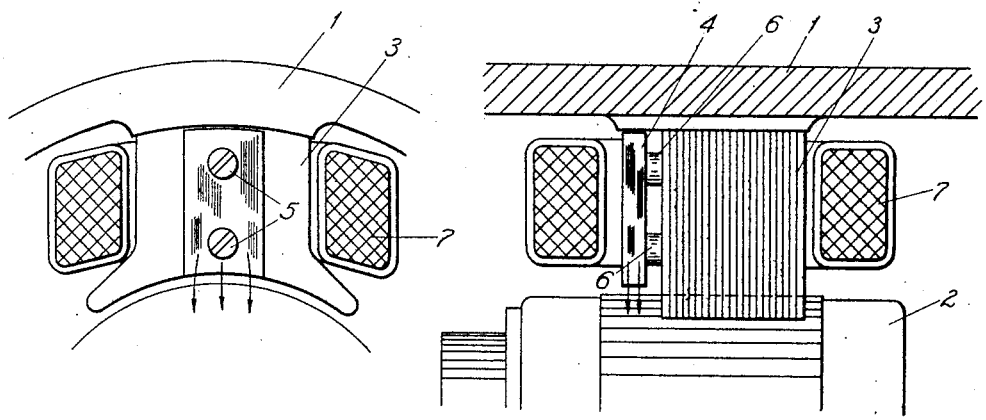
Figure 1 represents a fragmentary view illustrating one embodiment of the present invention.
Fig. 2 represents a fragmentary view illustrating the said embodiment at a different angle from that used in Fig. 1.

The field yoke of the dynamo-electric machine is indicated by the numeral 1. The armature of the dynamo-electric machine is indicated by the numeral 2. Mounted on the field yoke are pole pieces 3 which may be of the usual laminated construction. Located between the field yoke 1 and the armature 2, symmetrically with the center line of each of the pole pieces 3, is a permanent magnet 4. This permanent magnet may be mounted on the pole piece 3, if desired, being secured thereto in any preferred manner. The permanent magnet will extend from a position in close proximity to the field yoke 1, to a point close to the periphery of the armature 2. The permanent magnet 4 must be spaced away from the pole piece 3, preferably a distance greater than the length of air gap existing between said permanent magnet and the armature 2, to prevent the short-circuiting of the flux of said permanent magnet. For this reason, also, any holding means, as for instance the screws 5 and the spacers 6, must be of non-magnetic material. The field winding 7 may be mounted to surround both the pole piece 3 and the permanent magnet 4. A permanent magnet may be associated with each of the pole pieces of the dynamo electric machine or with any desired number of said poles.

It will be apparent that with the structure arranged according to the present invention, the magnet 4 will set up an initial flux through the armature, whereby an E. M. F. will be set up in the turns of said armature which will serve to excite the field windings. Therefore, initial excitation of the dynamo electric machine, when it is starting as a generator, will always be insured.

The present invention is capable of being embodied in a variety of different forms. For instance, the field magnet may be the rotor, while the armature may be the stator. The present invention is applicable to such a construction as well as to that illustrated. Many other modifications may be made without departing from the spirit of the invention. It is intended that the patent shall cover all such modifications that fall within the scope of the appended claims.

What I claim as new and desire to secure by Letters Patent of the United States is:—

1. In a dynamo-electric machine, in combination, a field pole piece, an armature in proximity thereto, a permanent magnet in proximity to said pole piece and said armature but presenting a greater air gap to said pole piece than to said armature.

2. In combination, a field pole piece, a permanent magnet arranged alongside thereof, an armature located adjacent said pole piece and said magnet, the air gap between said magnet and said pole piece being greater than between said magnet and said armature.

3. In combination, a field pole piece, a permanent magnet arranged alongside of but spaced from said pole piece, said permanent magnet embracing part of the same arc as said pole piece and being symmetrically arranged therewith, the air gap between said magnet and said pole piece being greater than between said magnet and said armature.

4. In a dynamo electric machine, in combination, a field pole piece, an armature in proximity thereto, a permanent magnet in proximity to said pole piece and said armature, the magnetic reluctance between said permanent magnet and said armature being less than between said permanent magnet and said pole piece.

In witness whereof I have hereunto subscribed my name.

WILLIAM A. TURBAYNE.

Copies of this patent may be obtained for five cents each, by addressing the "Commissioner of Patents, Washington, D. C."